April 1, 1969 G. H. LOOSE 3,436,109
STRESSED HERMETIC SEAL AND METHOD OF MAKING SAID SEAL
Filed Dec. 15, 1965

INVENTOR.
Guenter H. Loose
BY Walter S. Zebrowski
ATTORNEY

FIG. 5

```
┌─────────────────────────────────────────────────────────┐
│ PROVIDE A PREFORMED, APERTURED, GLASS-CERAMIC BODY; A   │
│ PREFORMED, SEALING GLASS BUSHING, AND A METAL MEMBER.   │
└─────────────────────────────────────────────────────────┘
                            │
                            ▼
┌─────────────────────────────────────────────────────────┐
│ PLACE THE BUSHING IN AN APERTURE OF THE                 │
│ BODY, WITH THE METAL MEMBER INSIDE THE                  │
│ BUSHING AND CONCENTRIC THEREWITH.                       │
└─────────────────────────────────────────────────────────┘
                            │
                            ▼
┌─────────────────────────────────────────────────────────┐
│ HEAT THE ASSEMBLED COMPONENTS TO AT LEAST THE           │
│ SOFTENING TEMPERATURE OF THE SEALING GLASS, BUT         │
│ BELOW THE DEFORMATION TEMPERATURE OF THE                │
│ GLASS-CERAMIC BODY.                                     │
└─────────────────────────────────────────────────────────┘
                            │
                            ▼
┌─────────────────────────────────────────────────────────┐
│ APPLY PRESSING FORCE TO OPPOSITE ENDS OF                │
│ THE SOFTENED BUSHING, FORMING A RIVET.                  │
└─────────────────────────────────────────────────────────┘
                            │
                            ▼
┌─────────────────────────────────────────────────────────┐
│ MAINTAIN TEMPERATURE WITHIN ABOVE RANGE FOR             │
│ A TIME SUFFICIENT TO FUSE THE RIVET TO THE              │
│ METAL MEMBER AND TO THE GLASS-CERAMIC BODY.             │
└─────────────────────────────────────────────────────────┘
                            │
                            ▼
        ┌────────────────────────────────┐
        │ COOL THE SEALED COMPONENTS.    │
        └────────────────────────────────┘
```

*INVENTOR.*
*Guenter H. Loose*

BY *Walter S. Zebrowski*

ATTORNEY

United States Patent Office 3,436,109
Patented Apr. 1, 1969

3,436,109
STRESSED HERMETIC SEAL AND METHOD OF MAKING SAID SEAL
Guenter H. Loose, Bradford, Pa., assignor to Corning Glass Works, Corning, N.Y., a corporation of New York
Filed Dec. 15, 1965, Ser. No. 514,092
Int. Cl. F16b *11/00*
U.S. Cl. 287—189.365                    7 Claims

ABSTRACT OF THE DISCLOSURE

A stressed, vacuum-tight hermetic seal between relatively thin glass-ceramic bodies and metal members wherein such members are commonly used as lead-through connectors and terminals for electronic components, the seal employing a bushing between the glass ceramic body and metal member having a coefficient of thermal expansion intermediate the thermal expansion coefficients of the glass-ceramic and the metal. Also, the method of forming such a seal is disclosed.

---

Vacuum-tight, or hermetic, seals are those which pass less than about $1 \times 10^{-8}$ cubic centimeters per second of helium gas through them.

Semicyrstalline ceramics, or glass-ceramics, are a relatively recent development in the glass industry. The process of making semicrystalline ceramic bodies involves heat treating glass bodies under such conditions that controlled crystallization is induced in them. Generally, the process comprises melting a glass-forming batch which contains a nucleating or crystallization-promoting agent, simultaneously shaping and cooling the melted batch into a glass body, and thereafter heat treating the glass body in accordance with a specific and carefully controlled schedule. In this manner the glass body is converted into a semicrystalline ceramic body composed of fine-grained, randomly-oriented crystals dispersed substantially uniformly in a glassy matrix and comprising a major proportion of the mass of the body.

United States Patent 2,971,853, issued to Stanley D. Stookey, teaches the formation of a semicrystalline ceramic body. United States Patent 2,628,160, also issued to Stanley D. Stookey, teaches a method of etching or sculpturing articles from certain glass-ceramic compositions. United States Patent 3,161,528, issued to Richard A. Eppler, teaches a method of making a semicrystalline ceramic body from photothermally opacifiable glasses, wherein the body may be given a particular and predetermined thermal expansion coefficient.

The ability to selectively etch, or sculpture, intricate configurations in certain glass-ceramic bodies, and the ability to provide them with particular thermal expansion coefficients, has led to the wide use of such bodies in such products as electron tube spacers, display tube elements, printed circuit boards, apertured substrates and the like. An example of a glass-ceramic material suitable for such purposes is one selected from the lithia, alumina, silicate system, also indicated as $Li_2O \cdot Al_2O_3 \cdot SiO_2$ system.

In addition to these advantages, many semicrystalline ceramics have desirable and useful physical properties such as high strength, impact resistance, opacity, thermal shock resistance, high dielectric strength, relatively high deformation temperature and the like.

Many disappointing efforts have been made to apply these briefly-described advantages of the lithia, alumina, silicate system to specific composite structures wherein it is desired to pass one or more electrically conductive members through a semicrystalline ceramic body and to achieve a vacuum-tight seal therebetween. Direct seals between such bodies and members have been unsuccessful. In a direct seal the glass-ceramic is heated to at least its deformation temperature, is deformed to imbed a lead wire, and a cooled. Such seals have been mechanically weak and have lacked vacuum-tightness, and the deformed glass-ceramic body has become brittle.

Efforts to form indirect seals between semicrystalline bodies and metal members have heretofore also been unsuccessful. Prior art indirect seals have been characterized by the use of metallic solders, films or powders interposed between the body and the metal member, and heated sufficiently to effect a solder joint. While such seals have been reasonably satisfactory with ceramic bodies, they are totally unsatisfactory with semicrystalline ceramic bodies. The heat required to effect an indirect seal of the type described destroys the properties of the semicrystalline ceramic and deforms the body made therefrom.

It is therefore an object of the present invention to provide a method for making strong, vacuum-tight seals between electrically conductive members and semicrystalline ceramic bodies wherein such members pass through, and are imbedded in, the bodies.

Another object of the present invention is to provide a strong, hermetic seal between a semicrystalline ceramic body and a metal lead-through member wherein the body retains its shape and wherein the semicrystalline ceramic retains its desirable physical properties.

Still another object of the present invention is to provide a simple, economical method for sealing one or more electrically conductive lead wires into a thin, apertured, semicrystalline ceramic substrate to produce a strong hermetically sealed, composite structure therefrom.

These together with other advantages, features and objects will be more apparent from the following detailed description and drawings.

The present invention includes an article having a hermetic compression seal as well as the method of forming such a seal, which method comprises the steps of: inserting into an aperture in a glass-ceramic body a member comprising a glass-sealing metal having a thermal expansion coefficient lower than that of said glass-ceramic, and a bushing comprising a thermally fusible vitreous material having a thermal expansion coefficient intermediate the thermal expansion coefficients of said metal and said glass-ceramic, with said bushing surrounding said member within said aperture and having opposed ends protruding therefrom; raising the temperature of said bushing, member and body to a temperature within the range of temperatures at least as high as the softening temperature of said vitreous material and below the deformation temperature of said body; pressing, while within said range, the protruding ends of said bushing to form rivet heads at each end, to lock the body therebetween; maintaining the temperature within said range for a time sufficient to fuse said bushing to said member and said body; and cooling the assembly so formed.

Referring to the drawings,

FIGURE 5 is a flow diagram illustrating the method of the present invention.

Figure 1:
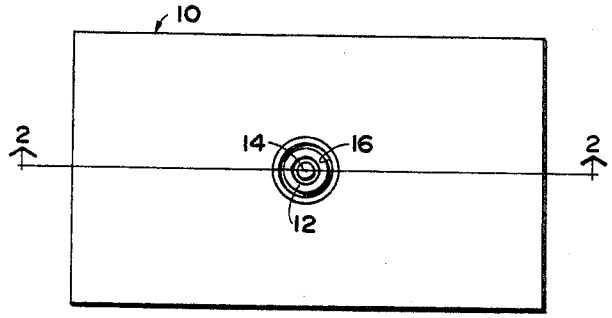
FIGURE 1 is a plan view of a flat, apertured body, or substrate, with a vitreous bushing and a metal member coaxially disposed within the aperture thereof.

In FIGURE 1 body 10 is shown with bushing 12 and metal member 14 coaxially disposed within aperture 16.

The bushing is formed to a suitable diameter for a close, but not tight, fit within the aperture, and a close, but not tight, fit around the metal member. The aperture, bushing and metal member are shown with a circular configuration in the plan view. Such a configuration is not critical, but is preferred for making a stressed hermetic seal in accordance with the present invention. Dimensions of the body, bushing and metal member are relatively unimportant, and may be made any convenient size. The body or substrate may be relatively thin compared to its length and width, exemplary thicknesses being between about 0.050" and 0.125", but are not limited thereto. A plurality of apertures, each containing corresponding bushings and metal members, may be formed in the body to permit a plurality of hermetic seals to be made therein.

The body is formed from a semicrystalline ceramic, of which exemplary compositions, selected from the lithia, alumina, silica system, are shown in Table I. These compositions are taught in the heretofore noted Eppler patent. The effect of heat treatment at different temperatures on the thermal expansion coefficients of these compositions is shown in Table II.

The bushing must be made from a thermally fusible material having a softening temperature below the deformation temperature of the glass-ceramic substrate, and a thermal expansion coefficient lower than that of the glass-ceramic and at least equal to, but preferably higher than that of the metal member.

Preferably, such a material is a glass having a thermal expansion coefficient intermediate the coefficients of said metal and said glass-ceramic, and being compatible with the metal. Such glasses are known in the art as sealing glasses. Compatibility between a sealing glass and a metal member refers in part to the ability of the thermally softened glass to "wet" the metal, which includes dissolving a portion of metal oxide coating in the glass, thus forming an intimate bond therebetween. Such a bond, or seal, after cooling, will be hermetic, and substantially free from defects such as bubbles, inclusions, poor oxide adherence and the like. Many sealing glasses exist, and are specifically chosen to have thermal expansion coefficients close, or equal, to those of the metals to which they are to be sealed. An exemplary sealing glass, suitable for sealing to a readily-oxidizable nickel-chrome-iron alloy consists of $SiO_2$—34%, PbO—58.5%, $K_2O$—6.5%, and $Sb_2O_3$—1%, by weight. This glass has a nominal thermal expansion coefficient of about $91 \times 10^{-7}$ cm./cm./° C. and a softening temperature of 580° C. Another suitable sealing glass, having a softening temperature of 630° C. and a nominal thermal expansion coefficient of about $89.5 \times 10^{-7}$ cm./cm./° C., consists essentially of $SiO_2$—57%, PbO—30%, $Na_2O$—4%, $K_2O$—8% and $Al_2O_3$—1%, by weight.

The metal member is preferably, but need not necessarily be, formed from a readily-oxidizable, glass-sealing metal. The thermal expansion coefficient of the metal must be lower than that of the glass-ceramic, and must be at least equal to, but is preferably lower than, the thermal expansion coefficient of the sealing glass.

By readily-oxidizable is meant the ability to form a surface oxide which adheres tightly to the parent metal, but which, in part, easily dissolves into the softened glass, and which, after cooling, forms a hermetic seal therebetween. Preferably, the metal member will be in the form of a cylindrical wire lead of suitable length having a diameter between about 0.015" and 0.065", made from an alloy of nickel, iron and chrome. As is well known in the art, such alloys are readily-oxidizable, are compatible with many sealing glasses, and one may be selected for a particular thermal expansion coefficient, within a wide range of such coefficients, by choosing the proportion of nickel, iron and chrome. An examplary alloy of the type described consists essentially of Fe—52%, Ni—42% and Cr—6%, by weight and has a thermal expansion coefficient of about $89 \times 10^{-7}$ cm./cm./° C. Other glass-sealing metals which do not readily oxidize such as gold and platinum, for example, may also be used.

Considering the above requirements, it will be seen that the three-component, composite structure of the present invention comprises a relatively high expansion glass-ceramic body surrounding an intermediate expansion sealing glass bushing which surrounds a lower expansion metal lead wire; all three components being sealed together. It is believed that the absolute values of the respective expansion coefficients of the three components are relatively unimportant except that in a particular structure the thermal expansion of the bushing should be intermediate the expansions of the body and the metal member. The expansion difference between the bushing and the body, and between the bushing and the metal member should not exceed about $5 \times 10^{-7}$ cm./cm./° C. A seal between the components of such a structure is known as a stressed seal, as opposed to a matched expansion seal, since upon cooling the relative expansion differences of the components induce compression in the bushing. More particularly, such a seal is termed a radial compression seal, which tightly and securely locks the metal member in place, because of the direction of action of the major compressive stress components.

Figure 2:
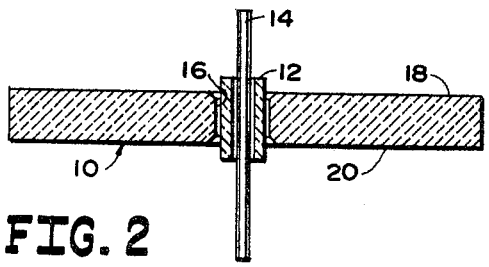
FIGURE 2 is a cross section of the body, bushing and member taken along line 2—2 of FIGURE 1.

In FIGURE 2 the length of bushing 12 is seen to be greater than the thickness of body 10, providing a greater quantity of vitreous material than may be entirely accommodated within aperture 16. Metal member 14 projects beyond the broad, flat surfaces 18 and 20 of the body, but need not protrude symmetrically from both sides as shown. The metal member serves as an electrically conductive lead-through from one side of the body to the other. It may also be conveniently used as a terminal for fastening electronic components to the body.

Figure 3:
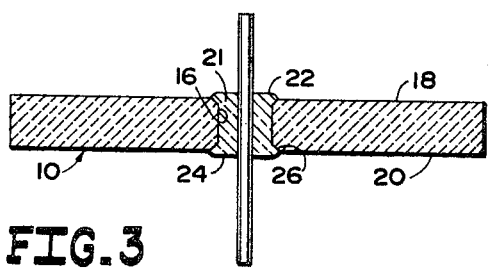
FIGURE 3 is a cross section of one embodiment of the present invention, after thermal processing.

In FIGURE 3, the bushing has been softened by heating, and has been pressed to form rivet 21 having enlarged, flattened heads 22 and 24, which are contiguous with body surfaces 18 and 20, respectively, adjacent aperture 16. The rivet heads are formed from the excess glass of bushing 12 projecting beyond the body surfaces as shown in FIGURE 2. It is necessary that sufficient glass be present in the bushing to form such a rivet, since the resulting seal depends on this configuration for much of its mechanical strength and resistance to the pulling and bending of the lead wire. It will be noted that the body has chamfered edges 26 bordering the aperture. Although not necessary, such chamfered edges are preferred in order to permit formation of shoulders on the rivet, providing a gradual transition from the large external heads 22 and 24 to the central portion contained therebetween.

Figure 4:
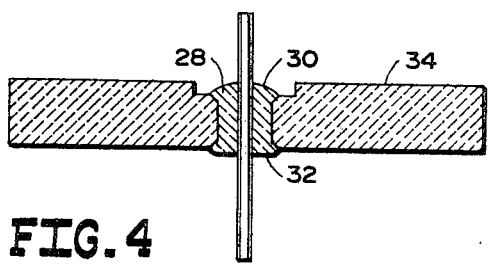
FIGURE 4 is a cross section of another embodiment of the present invention, after thermal processing.

FIGURE 4 illustrates another embodiment of the invention in which rivet 28 has one enlarged, rounded head 30 and one enlarged, flat head 32. Such a configuration may be necessitated in the cases where a body, or substrate, has raised portions 34 surrounding the aperture, preventing access to the rivet by the pressing tool.

*The method of the invention*

The present invention may be practiced as shown in FIGURE 5, by providing a preformed, apertured body made from a glass-ceramic, as hereinabove described. A preformed bushing is placed within an aperture of the body. A conductive lead wire having the appropriate expansion and sealing compatibility as hereinbefore described is placed inside, and concentric with, the bushing. The bushing has a thermal expansion coefficient intermediate the coefficients of the lead wire and the glass ceramic material. The assembled components are placed in a suitable jig or fixture to maintain the assembled alignment substantially as shown in FIGURES 1 and 2. The components are then heated to a temperature within the range of temperatures bounded by the softening temperature of the sealing glass and the deformation temperature of the glass-ceramic body. A pressing force is applied to opposite ends of the bushing which protrude beyond the body surfaces, while the bushing is in its softened condition. Such a pressing force may be conveniently applied by means of an appropriate tool incorporated in the jig, or it may be applied from a tool external to the assembly and jig, whichever is more convenient. The pressing force forms or shapes rivet heads on the ends of the bushing, transforming it into a rivet. At the same time, the bushing walls, thickened by the pressing force expand inwardly to imbed the lead wire and outwardly to fill the aperture. After pressing, the assembled components are maintained at a temperature within the aforementioned range of temperatures for a time sufficient to fuse the rivet to the body and to the lead. The components are then cooled. During cooling the glass-ceramic body contracts radially about the rivet and the rivet contracts radially about the lead wire. Because of the differential contraction between the components, due to their dissimilar expansion coefficients as hereinbefore described, the components are placed in a state of unrelieved radial compression forming a strong, vacuum-tight, compression seal therebetween. After cooling the sealed components are removed from the jig.

TABLE I.—EXAMPLES OF LITHIA, ALUMINA, SILICA GLASS-CERAMICS

|  | 1 | 2 | 3 | 4 | 5 | 6 | 7 |
|---|---|---|---|---|---|---|---|
| $Li_2O$ | 7.85 | 7.85 | 9.43 | 7.85 | 6.26 | 6.26 | 7.85 |
| $Na_2O$ | 1.24 | 1.24 | 1.49 | 1.24 | 0.99 | 0.99 | 0.99 |
| $K_2O$ | 3.32 | 3.33 | 3.99 | 3.32 | 2.66 | 2.66 | 2.66 |
| $ZnO$ | 3.00 | 3.50 | 3.50 | 4.00 | 2.50 | 3.00 | 4.00 |
| $Al_2O_3$ | 11.93 | 13.93 | 13.93 | 15.93 | 9.93 | 11.93 | 15.93 |
| $SiO_2$ | 72.3 | 69.8 | 67.3 | 67.3 | 77.3 | 74.8 | 69.8 |
| $Sb_2O_3$ | 0.40 | 0.40 | 0.40 | 0.40 | 0.40 | 0.40 | 0.40 |
| $CaO_2$ | 0.0118 | 0.0118 | 0.0118 | 0.0118 | 0.0118 | 0.0118 | 0.0118 |
| Ag | 0.12 | 0.12 | 0.12 | 0.12 | 0.12 | 0.12 | 0.12 |
| Au | 0.001 | 0.001 | 0.001 | 0.001 | 0.001 | 0.001 | 0.001 |

The glass forming batches set forth in Table I are calculated to the oxide basis in parts by weight, exclusive of impurities which may be found.

As explained in the hereinabove mentioned Eppler patent, thermal expansion coefficients of the semicrystalline ceramics formed from the compositions of Table I may be intentionally varied by final heat treatment, as shown in Table II. A particularly useful example for printed circuit boards is number 6 of Table I, wherein the final expansion coefficient, after treatment at 900° C., is $96.4 \times 10^{-7}$ cm./cm./° C.

TABLE II

| Batch No. | Expansion coeff. $\times 10^{-7}$ cm./cm./° C. final heat treatment temperature | | | | |
|---|---|---|---|---|---|
|  | 900° C. | 850° C. | 800° C. | 750° C. | 700° C. |
| 1 | 81.4 | 44.0 | 39.2 | 74.2 | 82.1 |
| 2 | 93.1 | 69.4 |  | 48.9 | 85.7 |
| 3 | 89.7 | 56.8 | 36.7 | 40.7 | 84.5 |
| 4 | 88.8 | 46.8 | 37.3 | 58.6 | 83.2 |
| 5 | 91.2 | 56.1 |  | 62.9 | 94.1 |
| 6 | 96.4 | 76.3 | 45.3 | 50.7 | 83.8 |
| 7 | 90.2 | 71.7 | 19.1 |  | 91.3 |

In a typical example of the present invention a wire terminal post is sealed to a printed circuit board. Glass-ceramic composition No. 6, of Table I treated at 900° C., is chosen for the circuit board material. Its nominal coefficient of thermal expansion is $96.4 \times 10^{-7}$ cm./cm./° C. The circuit board is 0.100″ thick and has a chemically etched aperture of 0.125″ diameter. A cylindrical, preformed bushing, made from a glass consisting of $SiO_2$—34%, PbO—58.5%, $K_2O$—6.5%, and $Sb_2O_3$—1% by weight, is placed within the aperture. The bushing has an outside diameter of 0.095″, a central hole of 0.025″ diameter, and a length of 0.250″. A conductive lead wire having a diameter of 0.016″ and made from ammoniated Sylvania #4 metal alloy is inserted in the hole of the bushing. The ammoniated metal has been found to produce a particularly satisfactory oxide for sealing purposes. These assembled components are placed in a jig, and covered on both sides by a pair of carbon plates which have been pre-drilled to accept the lead wires, and slightly counterbored to accept the ends of the bushing.

The carbon plates act as pressing tools to form the rivet heads on the bushing. A suitable weight is placed over the upper carbon plate to provide the necessary pressing force. The components and jig are then heated in a suitable furnace to a temperature of 690° C. which is maintained for 35 minutes; during which time the bushing softens and is transformed into a rivet by the pressing force, and is fused, or sealed, to the lead wire and to the glass-ceramic body. The components and jig are then cooled to room temperature and removed from the jig.

The resulting composite structure, formed in the above-described manner, has a vacuum-tight radial compression seal formed between the components thereof.

Although the present invention has been described with respect to specific details of certain embodiments thereof, it is not intended that such details be limitations upon the scope of the invention except insofar as set forth in the following claims.

What is claimed is:

1. A method of forming a hermetic compression seal comprising the steps of:

inserting into an aperture in a glass-ceramic body a member comprising a glass-sealing metal having a thermal expansion coefficient lower than that of said glass ceramic, and a bushing comprising a thermally fusible vitreous material having a thermal expansion coefficient intermediate the thermal expansion coefficients of said metal and said glass-ceramic, with said bushing surrounding said member within said aperture and having opposed ends protruding beyond said body;

raising the temperature of said bushing, member and body to a temperature within the range of temperatures at least as high as the softening temperature of said vitreous sealing material and below the deformation temperature of said body;

pressing the protruding ends of said bushing to form rivet heads at each end to lock the body therebetween;

maintaining said bushing, member, and body at a temperature within said range for a time sufficient to fuse said bushing to said member and said body; and cooling the assembly so formed.

2. A composite structure comprising an apertured glass-ceramic body with the aperture bordering wall region being chamfered at the ends of said aperture, a metal member having a thermal expansion coefficient lower than that of said glass-ceramic disposed within said aperture and protruding therefrom, and a bushing having a central portion disposed within said aperture surrounding said member, said bushing having enlarged, integral, opposite head portions terminating externally of said body and contiguous with respective external surfaces thereof locking said body therebetween, said bushing being formed from a vitreous material and being hermetically sealed to said body and said member.

3. The structure of claim 2 wherein said vitreous material is thermally fusible and has a softening temperature below the deformation temperature of said glass-ceramic.

4. A composite structure comprising an apertured glass-ceramic body, a metal member having a thermal expansion coefficient lower than that of said glass-ceramic disposed within said aperture and protruding therefrom, and a bushing having a central portion disposed within said aperture surrounding said member, said bushing having enlarged, integral, opposite head portions terminating externally of said body and contiguous with respective external surfaces thereof locking said body therebetween, said bushing being formed from a vitreous material that is thermally fusible and has a softening temperature below the deformation temperature of said glass-ceramic and has a thermal expansion coefficient intermediate the thermal expansion coefficients of said glass-ceramic and said metal member, said bushing being hermetically sealed to said body and said member.

5. The structure of claim 4 wherein said glass-ceramic is selected from the lithia, alumina, silicate system and has a thermal expansion coefficient between about 90 and $97 \times 10^{-7}$ cm./cm./° C.

6. The structure of claim 5 wherein said vitreous material consists essentially of $SiO_2$—34%, PbO—58.5%, $K_2O$—6.5% and $Sb_2O_3$—1% by weight.

7. The structure of claim 6 wherein said metal consists essentially of Fe—52%, Ni—42%, and Cr—6% by weight.

References Cited

UNITED STATES PATENTS 2,803,926　8/1957　Ekkers _____ 65—59 X
3,006,984　10/1961　Bol et al.

DONALL H. SYLVESTER, *Primary Examiner.*
ROBERT L. LINDSAY, SR., *Assistant Examiner.*

U.S. Cl. X.R.

65—36, 43, 59, 33; 161—196; 285—238, 158, 423; 106—39